July 14, 1931.  L. C. NOTBOHM  1,814,844

VEGETABLE GRATER

Filed Aug. 7, 1929

Inventor
Leonard C. Notbohm
By Adam E. Fisher
Attorney

Patented July 14, 1931

1,814,844

UNITED STATES PATENT OFFICE

LEONARD C. NOTBOHM, OF ROME, WISCONSIN

VEGETABLE GRATER

Application filed August 7, 1929. Serial No. 384,024.

This invention is a vegetable grater, the same being particularly adapted for the grating of potatoes and like vegetables. This grater utilizes the principle of a serrated or toothed cylinder rotatively mounted within a complementary outer casing, and the principal object of the invention is to provide a combination of such cylinder and casing with the teeth of the cylinder diagonally arranged upon the outer surface of the cylinder and so nicely related, fitted and adjusted relative to the inner surface of the casing, that the grated potato or other vegetable is wiped off of the cylinder at each end thereof, the grated vegetable entering and passing through the casing, from top to bottom, traveling obliquely from the center of the cylinder towards either end thereof between the teeth of the serrated cylinder and at the bottom accumulating and falling off into an inclined delivery trough.

Another object of the invention is to provide an assembly of the kind stated in a relatively simple, cheap and durable form of construction.

With the foregoing objects in view, attention is called to the accompanying drawings, wherein Figure 1 is an elevation, partly in full and partly in section, of my invention;

Figure 1:
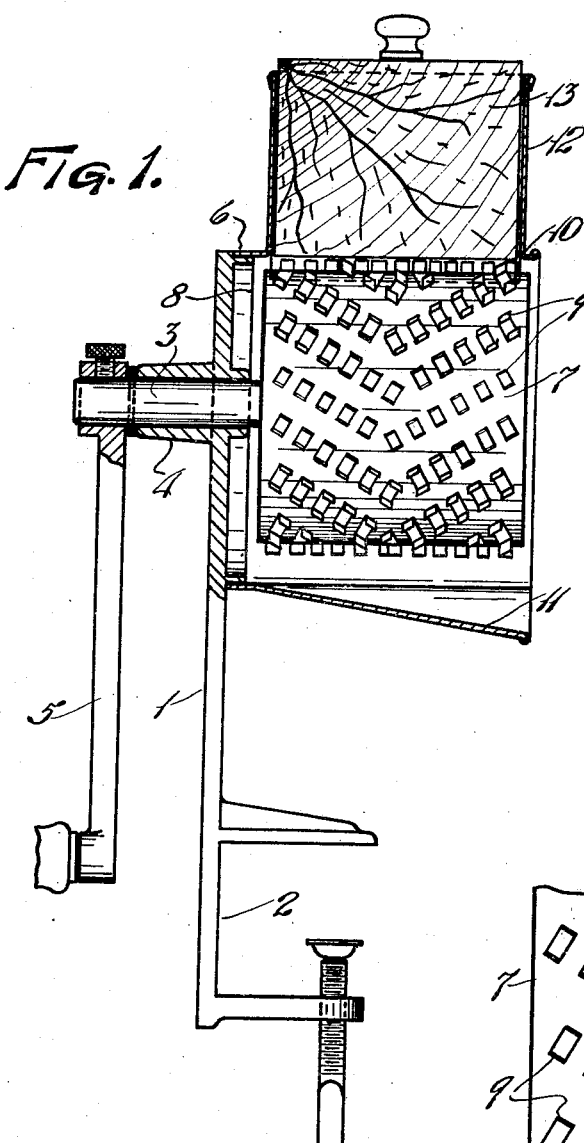
Figure 3:
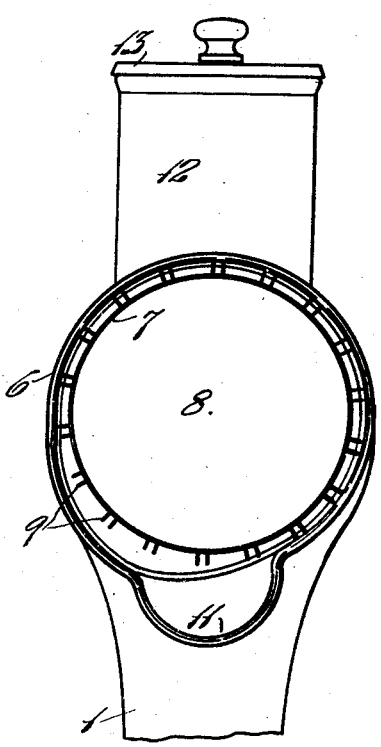
Figure 3 is a frontal elevation of the assembly shown in Figure 1.

The invention comprises a conventional form of standard 1 provided with a clamping element 2 for securing the utensil to a table (not shown), and carrying a stub shaft 3 suitably supported and journaled in a bearing 4 preferably formed or cast integrally with the standard 1. The usual operating crank 5 is mounted upon the outer end of the shaft 3. A cylindrical casing 6 is extended laterally from the upper end of the standard 1 and a toothed grating cylinder 7 having an inner end plate 8 is rigidly mounted at this plate upon the inner end of the shaft 3 within the casing 6. The outer end of the casing 6 is preferably left open but may be closed with a removable cover (not shown) if desired.

Figure 2:
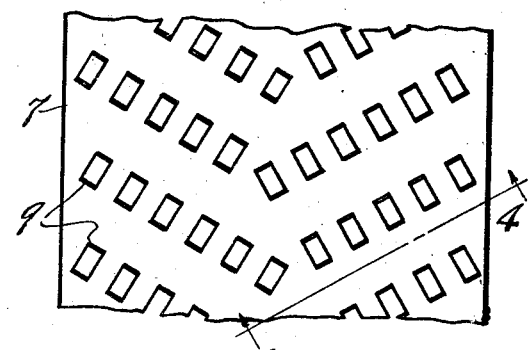
Figure 2 is an enlarged sectional plan view of the cylinder.
Figure 4:
Figure 4 is a detail of the arrangement and mounting of the teeth.

My invention resides wholly in the peculiar oblique, angular or diagonal arrangement of the teeth 9 upon the outer surface of the cylinder 7 and the close fitting relation of the teeth 9 to the inner surface of the housing or casing 6. The casing 6 is cylindrical, is open at the top side as shown at 10 for the insertion of the vegetables and is formed with the inclined trough 11 at the bottom side for the discharge of the grated vegetables. A suitable box 12 is mounted upon the open side of the casing for the initial reception of the vegetables; and a follower block 13 is freely mounted therein for use in forcing the vegetables down upon the grater cylinder. The grating cylinder 7 is provided with outstanding teeth or serrations 9, which are punched outwardly from the strip of metal before the same is formed up into the cylinder, and these teeth 9 are mounted in rows extending angularly from a line defined upon the outer surface of the cylinder by a plane passed transversely through the center of the cylinder towards either end of the cylinder in such a manner that upon the rotation of the cylinder 7 in the usual or clockwise direction, the teeth more centrally located in the several rows will move in advance of those teeth located towards the ends of the rows and at the ends of the cylinder. This arrangement results in a V-shaped formation of the several rows of teeth as shown in Figures 1 and 2.

In addition to the angular arrangement of the teeth 9 as stated, their extremities are also nicely adjusted towards the inner surface of the casing 6, whereby the said teeth are caused to revolve as closely as possible to the inner surface of the casing. Thus arranged and mounted, the vegetable (not shown) in the act of being grated, cannot enter the casing except between the teeth of the grating cylinder 7 which means, of course, that the vegetable is necessarily grated very finely and cleanly. No part of the vegetable can enter the casing riding upon the teeth, or between the extremities of the teeth and the inner wall of the casing. As the cylinder 7 revolves, the grated vegetable is pushed along diagonally between the rows of teeth from the center towards either end of the grating cylinder, and this cylinder being at the same time rotated, the result is that the grated vegetable is carried down to the lower side of the casing and accumulates there and falls into the trough 11 whence it is pushed by its own accumulation out into any receptacle placed thereunder. The close adjustment of the teeth towards the wall of the casing obtains also at the lower side of the assembly, whereby the grated vegetable as it accumulates at the bottom, is scraped off into the trough 11 and prevented from continuously rotating with the rotation of the cylinder.

It is thought that the use and operation of the device will be fully understood from the foregoing description. This grater produces very finely and nicely ground products.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a vegetable grater, a cylindrical casing, a greater cylinder rotatably mounted therein, the latter having a plurality of rows of cutting teeth outstanding upon its outer cylindrical surface and adapted to move closely to the inner surface of the casing without contacting therewith, the said rows of teeth extending angularly from a line defined upon the outer surface of the cylinder by a plane passed transversely through the center of the cylinder, towards either end of the cylinder, in V-shaped formations, so that upon the rotation of the cylinder in the required direction the teeth more centrally located in the several rows will move in advance of those teeth located towards the ends of the rows at the ends of the cylinder, said teeth being channel shaped in form and so arranged and positioned on the drum and in the said rows that the channels of the teeth extend in the direction of their respective rows, whereby the grated vegetable is pushed along diagonally between the said rows of teeth from the center towards either end of the grating cylinder and off the grating cylinder.

In testimony whereof I affix my signature.

LEONARD C. NOTBOHM.